(12) United States Patent
Banning

(10) Patent No.: US 8,303,671 B2
(45) Date of Patent: *Nov. 6, 2012

(54) COLORANT COMPOUNDS

(75) Inventor: Jeffrey H. Banning, Hillsboro, OR (US)

(73) Assignee: Xerox Corporation, Norwalk, CT (US)

( * ) Notice: Subject to any disclaimer, the term of this patent is extended or adjusted under 35 U.S.C. 154(b) by 741 days.

This patent is subject to a terminal disclaimer.

(21) Appl. No.: 11/702,892

(22) Filed: Feb. 6, 2007

(65) Prior Publication Data

US 2008/0184911 A1 Aug. 7, 2008

(51) Int. Cl.
*C09B 67/24* (2006.01)
*C09B 67/34* (2006.01)

(52) U.S. Cl. .............. 8/644; 8/636; 8/638; 8/657; 8/658

(58) Field of Classification Search .................. 8/636
See application file for complete search history.

(56) References Cited

U.S. PATENT DOCUMENTS

| | | | |
|---|---|---|---|
| 2,922,690 A | 1/1960 | Mueller et al. | |
| 3,653,932 A | 4/1972 | Berry et al. | |
| 4,390,369 A | 6/1983 | Merritt et al. | |
| 4,484,948 A | 11/1984 | Merritt et al. | |
| 4,658,064 A | 4/1987 | Moore et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 4,899,761 A | 2/1990 | Brown et al. | 428/32.1 |
| 5,006,170 A | 4/1991 | Schwarz et al. | |
| 5,013,857 A | 5/1991 | Berneth et al. | |
| 5,151,120 A | 9/1992 | You et al. | |
| 5,221,335 A | 6/1993 | Williams et al. | |
| 5,279,655 A * | 1/1994 | Takazawa et al. | 106/31.43 |
| 5,372,852 A | 12/1994 | Titterington et al. | |
| 5,496,879 A | 3/1996 | Griebel et al. | |
| 5,621,022 A | 4/1997 | Jaeger et al. | |
| 5,782,966 A | 7/1998 | Bui et al. | |
| 6,001,899 A * | 12/1999 | Gundlach et al. | 523/160 |
| 6,174,937 B1 | 1/2001 | Banning et al. | |
| 6,309,453 B1 | 10/2001 | Banning et al. | |
| 7,034,185 B2 | 4/2006 | Banning et al. | |
| 2004/0214918 A1 * | 10/2004 | Banning et al. | 523/160 |
| 2004/0261657 A1 * | 12/2004 | Wu et al. | 106/31.29 |
| 2008/0184910 A1 | 8/2008 | Banning | |
| 2008/0186371 A1 | 8/2008 | Banning | |
| 2008/0187664 A1 | 8/2008 | Banning | |

FOREIGN PATENT DOCUMENTS

| | | |
|---|---|---|
| EP | 0187352 | 7/1986 |
| EP | 0206286 | 12/1986 |
| EP | 1 347 030 A1 | 9/2003 |
| EP | 1 471 116 A1 | 10/2004 |
| EP | 1 491 595 | 12/2004 |
| EP | 1 493 781 A1 | 1/2005 |
| EP | 1 528 085 A1 | 5/2005 |
| EP | 1 808463 | 7/2007 |
| GB | 828 394 A | 2/1960 |
| GB | 2003906 A * | 3/1979 |
| WO | WO 94/04619 | 3/1994 |
| WO | WO 03 042 989 | 5/2003 |

OTHER PUBLICATIONS

Clariant, Power Point Presentation, Jan. 2001, (sent to Xerox, Wilsonville, Oregon, Jun. 1, 2006 and presented on Jun. 5, 2006), 11 pages.
European Search Report dated May 17, 2011, for European Patent application No. 08150139.7, 5 pages.
Office Action Mailed Jun. 22, 2010 for co-pending U.S. Appl. No. 11/702,929, filed Feb. 6, 2007, entitled "Phase Change Inks Containing Colorant Compounds," of Jeffrey H. Banning, 30 pages.
English Abstract for German Patent Publication DE 4205636AL, Aug. 1993.
English Abstract for German Patent Publication DE 4205713AL, Mar. 1996.
Clariant, Power Point Presentation, Jan. 2001, (sent to Xerox, Wilsonville, Oregon, Jun. 1, 2006, and presented on Jun. 5, 2006), 11 pages.

* cited by examiner

*Primary Examiner* — Harold Pyon
*Assistant Examiner* — Katie L Hammer
(74) *Attorney, Agent, or Firm* — Oliff & Berridge, PLC

(57) ABSTRACT

A composition including a basic dye component and an acid dye component providing an internal salt composition wherein at least one of the basic dye component, the acid dye component, or both the basic dye component and the acid dye component comprises a waxy moiety.

2 Claims, No Drawings

COLORANT COMPOUNDS

Cross-reference is made to the following co-pending applications:

Co-pending Application U.S. Ser. No. 11/702,929, filed concurrently herewith, entitled "Phase Change Inks Containing Colorant Compounds," with the named inventor Jeffery H. Banning, the disclosure of which is totally incorporated herein by reference, discloses a phase change ink composition comprising a phase change ink carrier and a colorant compound.

Co-pending Application U.S. Ser. No. 11/702,890, filed concurrently herewith, entitled "Colorant Compounds," with the named inventor Jeffery H. Banning, the disclosure of which is totally incorporated herein by reference, discloses a colorant compound.

Co-pending Application U.S. Ser. No. 11/702,818, filed concurrently herewith, entitled "Phase Change Inks Containing Colorant Compounds," with the named inventor Jeffery H. Banning, the disclosure of which is totally incorporated herein by reference, discloses a phase change ink composition comprising a phase change ink carrier and a colorant compound.

BACKGROUND

The present disclosure is generally related to colorant compounds. More specifically, the present disclosure is directed to colorant compounds particularly suitable for use in hot melt or phase change inks. One embodiment of the present disclosure is directed to compositions having a basic dye component and an acid dye component providing an internal salt composition wherein at least one of the basic dye component, the acid dye component, or both the basic dye component and the acid dye component comprises a waxy moiety.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

While known compositions and processes are suitable for their intended purposes, a need remains for new colorant compositions for making composite black and other colors (for example, green). In addition, a need remains for colorant compositions particularly suitable for use in phase change inks. Further, a need remains for black and other colorants with desirable thermal stability. Additionally, a need remains for black and other colorants that exhibit minimal undesirable discoloration when exposed to elevated temperatures. There is also a need for black and other colorants that exhibit a desirable brilliance. In addition, there is a need for black and other colorants that exhibit a desirable hue. Further, there is a need for black and other colorants that are of desirable chroma. Additionally, there is a need for black and other colorants that have desirably high lightfastness characteristics. A need also remains for black and other colorants that have a desirably pleasing color. In addition, a need remains for black and other colorants that exhibit desirable solubility characteristics in phase change ink carrier compositions. Further, a need remains for black and other colorants that enable phase change inks to be jetted at temperatures of over 135° C. while maintaining thermal stability. Further, a need remains for magenta colorants for use in solid ink printers that operate with lower print head temperatures much lower than 135° C. as well as in ultraviolet radiation curable systems. Additionally, a need remains for black and other colorants that enable phase change inks that generate images with low pile height. There is also a need for black and other colorants that enable phase change inks that generate images that approach lithographic thin image quality. In addition, there is a need for black and other colorants that exhibit oxidative stability. Further, there is a need for black and other colorants that do not precipitate from phase change ink carriers. Additionally, there is a need for black and other colorants that do not, when included in phase change inks, diffuse into adjacently printed inks of different colors. A need also remains for black and other colorants that do not leach from media such as phase change ink carriers into tape adhesives, paper, or the like. In addition, a need remains for black and other colorants that, when incorporated into phase change inks, do not lead to clogging of a phase change ink jet printhead. Further, there is a need for black and other colorants that enable phase change inks that generate images with sharp edges that remain sharp over time. Additionally, there is a need for black and other colorants that enable phase change inks that generate images which retain their high image quality in warm climates. Further, there is a need for black and other colorants that enable phase change inks that generate images of desirably high optical density. Additionally, there is a need for black and other colorants that, because of their good solubility in phase change ink carriers, enable the generation of images of low pile height without the loss of desirably high optical density. A need also remains for black and other colorants that enable cost-effective inks.

The appropriate components and process aspects of the each of the foregoing may be selected for the present disclosure in embodiments thereof.

SUMMARY

The present disclosure is directed to a composition having a basic dye component and an acid dye component providing an internal salt composition wherein at least one of the basic dye component, the acid dye component, or both the basic dye component and the acid dye component comprises a waxy moiety.

The present disclosure is further directed to compositions having a basic dye component and an acid dye component providing an internal salt composition wherein at least one of the basic dye component or the acid dye component comprises a waxy moiety, wherein the basic dye component comprises a compound of the formula

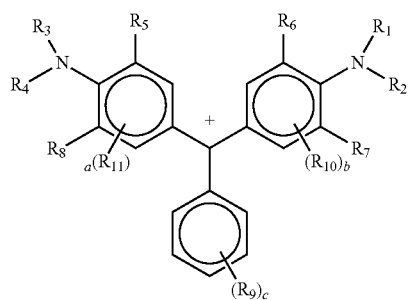

wherein $R_1$, $R_2$, $R_3$, and $R_4$, each, independently of the others, is (i) a hydrogen atom, (ii) an alkyl group, (iii) an aryl group, (iv) an arylalkyl group, or (v) an alkylaryl group, wherein $R_5$, $R_6$, $R_7$, and $R_8$, each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, wherein $R_5$ and $R_6$ can be joined together to form a ring, and wherein $R_1$, $R_2$, $R_3$, $R_4$, $R_5$ and $R_6$ can each be joined to a phenyl ring in the central structure, wherein $R_1$ and $R_2$ can each optionally be joined to one or both of $R_6$ and $R_7$ to form a ring, wherein $R_3$ and $R_4$ can each optionally be joined to one or both of $R_5$ and $R_8$ to form a ring; wherein $R_9$, $R_{10}$, and $R_{11}$, are each independently of the others optionally included and wherein if included each of $R_9$, $R_{10}$, and $R_{11}$, independently of the others, is (i) a hydroxy group, (ii) a halogen atom, (iii) an amine group, (iv) an imine group, (v) an ammonium group, (vi) a cyano group, (vii) a pyridine group, (viii) a pyridinium group, (ix) an ether group, (x) an aldehyde group, (xi) a ketone group, (xii) an ester group, (xiii) an amide group, (xiv) a carbonyl group, (xv) a thiocarbonyl group, (xvi) a sulfoxide group, (xvii) a nitrile group, (xviii) a mercapto group, (xix) a nitro group, (xx) a nitroso group, (xxi) a sulfone group, (xxii) an acyl group, (xxiii) an acid anhydride group, (xxiv) an azide group, (xxv) an azo group, (xxvi) a cyanato group, (xxvii) an isocyanato group, (xxviii) a thiocyanato group, (xxix) an isothiocyanato group, (xxx) a urethane group, (xxxi) a urea group, or a mixture or combination thereof, and the like, wherein two or more substituents can be joined together to form a ring, wherein $R_9$, $R_{10}$, and $R_{11}$ can each be joined to a phenyl ring in the central structure;

and wherein the acid dye component includes an anion providing a counter ion to the basic dye component providing a basic dye-acid dye internal salt composition.

In embodiments, at least one of the basic dye component or the acid dye component comprises a waxy moiety or both the basic dye component and the acid dye component comprise a waxy moiety. As used herein, the term waxy moiety means having sufficient carbon atoms in the alkyl portion to be soluble in hot melt or phase change ink vehicles (hot melt ink vehicles typically comprising a wax). For example, in embodiments, a waxy moiety herein is alkyl group having from about 4 to about 150 carbon atoms. For example, in embodiments, a waxy moiety herein is an alkyl group having about 4, 5, 6, 7, 8, 9, 10, 12, 16, or 18 carbon atoms, or about 30 to about 150 carbon atoms, an alkylaryl group having about 4, 5, 6, 7, 8, 9, 10, 12, 16, or 18 carbon atoms, or about 30 to about 150 carbon atoms, or an arylalkyl group having about 4, 5, 6, 7, 8, 9, 10, 12, 16, or 18 carbon atoms, or about 30 to about 150 carbon atoms. In embodiments, a waxy moiety herein is an aryl group having from about 6 to about 20 carbon atoms or from about 6 to about 12 carbon atoms. In embodiments, the ratio of alkyl carbon atoms to aryl carbon atoms in the waxy moiety is from about 10 to about 1 or from about 2 to about 1.

DETAILED DESCRIPTION

The present disclosure is directed to a composition having a basic dye component and an acid dye component providing an internal salt composition wherein at least one of the basic dye component, the acid dye component, or both the basic dye component and the acid dye component comprises a waxy moiety. As used herein, the term waxy moiety means having sufficient carbon atoms in the alkyl portion to be soluble in hot melt or phase change ink vehicles (such vehicles typically comprising a wax). For example, in embodiments, a waxy moiety herein is an alkyl group having from about 4 to about 150 carbon atoms. For example, in embodiments, a waxy moiety herein is an alkyl group having about 4, 5, 6, 7, 8, 9, 10, 12, 16, or 18 carbon atoms, or about 30 to about 150 carbon atoms, an alkylaryl group having about 4, 5, 6, 7, 8, 9, 10, 12, 16, or 18 carbon atoms, or about 30 to about 150 carbon atoms, or an arylalkyl group having about 4, 5, 6, 7, 8, 9, 10, 12, 16, or 18 carbon atoms, or about 30 to about 150 carbon atoms. In embodiments, a waxy moiety herein is an aryl moiety having from about 6 to about 20 carbon atoms or from about 6 to about 12 carbon atoms. In embodiments, the ratio of alkyl carbon atoms to aryl carbon atoms in the waxy moiety is from about 10 to about 1 or from about 2 to about 1.

Basic dyes suitable for compositions can be selected from any basic dye listed in the Color Index, including for example, but not limited to, analogs of Basic Green 1, 4, and 5; Basic orange 2, 14, 21; Basic Red 1, 2, 5, 9, and 29; Basic Violet 1, 2, 3, 4, 10; Basic yellow 1 and 2, mixtures and combinations thereof, and the like, among others, wherein at least one of the basic dye component, the acid dye component, or both the basic dye component and the acid dye component comprises a waxy moiety.

Acid dyes suitable for compositions can be selected from any acid dye listed in the Color Index, including for example, but not limited to, Acid Black 1, 2, 24, and 48; Acid Blue 1, 7, 9, 25, 29, 40, 45, 74, 80, 83, 90, 92, 113, 120, 129, 147; Acid Green 1, 3, 5, 25, 27, and 50; Acid Orange 6, 7, 8, 10, 12, 51, 52, 63, and 74; acid Red 1, 4, 8, 14, 17, 18, 26, 27, 29, 37, 44, 50, 51, 52, 66, 73, 87, 88, 91, 92, 94, 97, 103, 114, 150, 151, and 183; Acid Violet 79, 17, and 19; Acid Yellow 1, 3, 9, 11, 17, 23, 25, 29, 34, 36, 42, 54, 73, 76, and 99, mixtures and combinations thereof, and the like, among others, wherein at least one of the basic dye component, the acid dye component, or both the basic dye component and the acid dye component comprises a waxy moiety.

The present disclosure is directed in embodiments to compositions having a basic dye component and an acid dye component providing an internal salt composition wherein at least one of the basic dye component or the acid dye component comprises a waxy moiety, or wherein both the basic dye component and the acid dye component comprises a waxy moiety, wherein the basic dye component comprises a compound of the formula

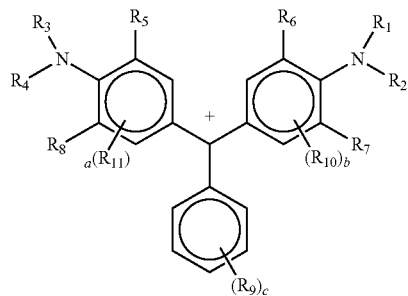

wherein $R_1$, $R_2$, $R_3$, $R_4$, $R_5$, $R_6$, $R_7$, and $R_8$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, boron, phosphorus, and the like either may or may not be present in the alkyl group), in one embodiment with at least about 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iv) an arylalkyl group, (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like or (v) an alkylaryl group, (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like wherein $R_1$ and $R_2$ can be joined together to form a ring, wherein $R_3$ and $R_4$ can be joined together to form a ring, wherein $R_5$ and $R_6$ can be joined together to form a ring, and wherein $R_1$, $R_2$, $R_3$, $R_4$, $R_5$ and $R_6$ can each be joined to a phenyl ring in the central structure; wherein $R_1$ and $R_2$ can each optionally be joined to one or both of $R_6$ and $R_7$ to form a ring, wherein $R_3$ and $R_4$ can each optionally be joined to one or both of $R_5$ and $R_8$ to form a ring;

wherein each of $R_9$, $R_{10}$, and $R_{11}$, independently of the others, is optionally included and wherein if included each of each of $R_9$, $R_{10}$, and $R_{11}$, independently of the others, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, and in one embodiment with no more than about 50 carbon atoms, in another embodiment with no more than about 30 carbon atoms, and in yet another embodiment with no more than about 18 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as benzyl or the like, (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 18 carbon atoms, although the number of carbon atoms can be outside of these ranges, such as tolyl or the like, (v) a halogen atom, such as fluorine, chlorine, bromine, iodine, or the like, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfide group, (xxi) a sulfoxide group, (xxii) a mercapto group, (xxiii) a nitroso group, (xxiv) an acyl group, (xxv) an acid anhydride group, (xxvi) an azide group, (xxvii) an azo group, (xxviii) a cyanato group, (xxix) an isocyanato group, (xxx) a thiocyanato group, (xxxi) an isothiocyanato group, (xxxii) a urethane group, or (xxxiii) a urea group, wherein $R_9$, $R_{10}$ and $R_{11}$, can each be joined to a phenyl ring in the central structure;

wherein a, b and c each, independently of the others, is an integer which is 0, 1, 2, or 3;

and wherein the acid dye component includes an anion providing a counter ion to the basic dye component providing a basic dye-acid dye internal salt composition (that is, the anion is the acid dye counter ion).

Colorants of the present disclosure can be prepared by any desired or effective procedure.

Any desired basic dye can be selected for embodiments herein. For example, basic dyes can include any basic dye listed in the Color Index, including but not limited to, for example, analogs of Basic Green 1, 4, and 5; Basic Orange 2, 14, 21; Basic Red 1, 2, 5, 9, and 29; Basic Violet 1, 2, 3, 4, 10; and Basic Yellow 1 and 2, among others.

Further any desired acid dye can be selected for embodiments herein. For example, acid dyes can include any acid dye listed in the Color Index, including but not limited to Acid Black 1, 2, 24, 26, 29, 50, 52, 58, 58:1, 60, 63, 63:1, 65, 76, 77, 92, 94, 107, 127, 131, 131:1, 132, 132:1, 139, 164, 170, 170:1172, 187, 188, 189, 194, 214, 215, 218, 222, and 224; Acid Blue 1, 7, 9, 15, 22, 25, 27, 29, 40, 41, 45, 61:1, 62, 72, 74, 80, 83, 90, 92, 93, 104, 113, 118, 120, 127, 127:1, 129, 140, 145, 147, 158, 170, 171, 172, 182, 185, 193, 204, 205, 209, 221, 225, 229, 232, 239, 247, 258, 260, 264, 277, 278, 279, 280, 284, 288, 290, 296, 298, 312, 317, 321, 324, 330, 335, and 455; Acid Brown 14, 19, 28, 44:1, 45, 45:1, 50, 58, 96, 97, 98, 103, 106, 107, 108, 110, 112, 113, 114, 116, 126, 127, 147, 160, 161, 163 m, 165, 188, 189, 191, 216, 226, 227, 235, 237, 239, 248, 282, 283, 289, 298, 304, 311, 330, 341, 342, 343, 345, 348, 349, 355, 357, 358, 359, 360, 362, 384, 396, and 397; Acid Green 1, 3, 5, 9, 12, 16, 20, 25, 27, 28, 35, 40, 41, 70, 104, 108, 112, 113, and 116; Acid Orange 1, 3, 6, 7, 8, 10, 12, 24, 33, 47, 51, 52, 60, 61, 62, 63, 64, 67, 69, 74, 80, 86, 116, 120, 127, 135, 142, 144, 154, 156, 161, 162, and 168; Acid Red 1, 2, 4, 8, 14, 17, 18, 26, 27, 29, 33, 37, 42, 44, 50, 51, 52, 57, 64, 66, 73, 80, 85, 87, 88, 89, 90, 91, 92, 94, 97, 99, 103, 111, 114, 115, 118, 119, 127, 128, 131, 137, 138, 143, 145, 150, 151, 167, 174, 182, 183, 186, 194, 211, 213, 217, 226, 249, 251, 252, 257, 259, 260, 263, 264, 266, 274, 289, 299, 310, 308, 315, 316, 336, 337, 359, 360, 361, 362, 364, 384, 395, 396, 399, 404, 410, 414, 415, 426, 439, and 735; Acid Violet 1, 3, 7, 9, 11, 12, 17, 19, 34, 43, 47, 48, 49, 54, 66, 76, 90, 102, 102:1, 109, 121, and 126; Acid Yellow 1, 3, 5, 7, 9, 11, 17, 19, 23, 25, 29, 34, 36, 40, 42, 44, 49, 54, 61, 65, 67, 73, 76, 79, 99, 104, 114, 116, 121, 127, 128, 129, 135, 137, 151, 152, 158:1, 159, 159:1, 169, 174, 184, 198, 199, 200, 204, 218, 219, 219:1220, 221, 230, 232, 235, 239, and 241 and 99, among others, and mixtures and combinations thereof.

See, for example, Color Index International, a reference database jointly maintained by the Society of Dyers and Colourists and the American Association of Textile Chemists and Colorists, available online at http://www.colour-index.org/.

In embodiments, synthesis can comprise, for example, synthesis of a Leuco version of a basic dye component via a condensation step, oxidation of the Leuco version of the basic dye, formation of the carbinol form of the basic dye, formation of an acid containing dye component, for example a carboxylic acid containing methine dye, and formation of a basic dye-acid dye internal salt composition.

Synthesis of Leuco Version of Basic Dye Component

For example, the Leuco version of the basic dye component can be synthesized by condensation reaction of an aldehyde with an aniline having the desired pendant groups selected as defined for the colorant herein, heated, either neat or, optionally, in the presence of a solvent, after which an acid is added, for example concentrated $H_2SO_4$ with additional heating.

The aldehyde component and the aniline component are present in any desired or effective relative amounts, in one embodiment at least about 1 mole of aldehyde component per every 2 moles of aniline component, in another embodiment at least about 0.5 mole of aldehyde component per every 2 moles of aniline component, and in yet another embodiment at least about 0.9 mole of aldehyde component per every 2 moles of aniline component, and in one embodiment no more than about 1.9 moles of aldehyde component per every 2 moles of aniline component, in another embodiment no more than about 1.5 moles of aldehyde component per every 2 moles of aniline component, and in yet another embodiment no more than about 1.1 moles of aldehyde component per every 2 moles of aniline component, although the relative amounts can be outside of these ranges.

If desired, the reaction can be run neat, in the absence of a solvent. In addition, if desired, the reaction can be run in the presence of an optional solvent. Examples of suitable solvents include tetramethylene sulfone (sulfolane), N-methyl pyrrolidone, dimethyl formamide, dimethyl sulfoxide, octanol, or the like, as well as mixtures thereof. When present, the optional solvent is present in any desired or effective amount, in one embodiment at least about 1 liter per every 0.1 mole of aldehyde component, in another embodiment at least about 1 liter per every 0.3 mole of aldehyde component, and in yet another embodiment at least about 1 liter per every 0.35 mole of aldehyde component, and in one embodiment no more than about 1 liter per every 2 moles of aldehyde component, in another embodiment no more than about 1 liter per every 1.5 moles of aldehyde component, and in yet another embodiment no more than about 1 liter per every 1 mole of aldehyde component, although the relative amounts can be outside of these ranges.

The mixture of aldehyde component, aniline component, and optional solvent is then heated to any effective temperature, in one embodiment at least about 62° C., in another embodiment at least about 100° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of aldehyde component, aniline component, and optional solvent is heated for any effective period of time, in one embodiment at least about 5 minutes, in another embodiment at least about 2 hours, and in yet another embodiment at least about 3 hours, in yet another embodiment at least about 24 hours, and in one embodiment no more than about 4 days, in another embodiment no more than about 60 hours, and in yet another embodiment no more than about 40 hours, although the time can be outside of these ranges.

The product is then neutralized, for example with a NaOH solution, and collected, for example via vacuum filtration. The crude product can then, if desired, be purified, for example by washing with water.

Oxidation of the Leuco Version of the Basic Dye Component

The Leuco version of the basic dye component can then be oxidized for example by combining the Leuco version of the basic dye component with a suitable oxidizing agent heated, either neat or, optionally, in the presence of a solvent, for a period of time and at a temperature sufficient to assure complete oxidation of the Leuco form of the dye to the fully developed form.

Any suitable oxidizing agent can be selected in embodiments herein. For example, the oxidizing agent can be selected from the group consisting of, but not limited to, chloranil, benzoquinone, DDQ (2,3-dichloro-5,6-dicyano-1,4-benzoquinone), as well as other chlorinated quinines, $MnO_2$, $PbO_2/HCl$, and mixtures and combinations thereof See, for example, U.S. Pat. No. 5,013,857, which is hereby incorporated by reference herein in its entirety, which is not meant to limit the present disclosure or claims, entitled "Process for the preparation of sulpho-free triphenyl-methane dyestuffs."

The oxidizing agent can be selected in any suitable amount, for example, in embodiments, about 1 mole of oxidizing agent per every 0.9 moles of Leuco version of the basic dye component, in another embodiment about 1 mole of oxidizing agent component per every 0.95 moles of Leuco version of the basic dye component, in another embodiment about 1 mole of oxidizing agent per every 1 mole of Leuco version of the basic dye component, and in yet another embodiment about 5 mole of oxidizing agent per every 1 mole of Leuco version of the basic dye component, and in one embodiment no more than about 2 moles of oxidizing agent per every 1 mole of Leuco version of the basic dye component, in another embodiment no more than about 1.75 moles of oxidizing agent per every 1 mole of Leuco version of the basic dye component, and in yet another embodiment no more than about 1.5 moles of oxidizing agent per every 1 mole of Leuco version of the basic dye component, although the relative amounts can be outside of these ranges.

If desired, the reaction can be run neat, in the absence of a solvent. In addition, if desired, the reaction can be run in the presence of an optional solvent. Examples of suitable solvents include, but are not limited to, water, methanol, isopropanol, ethyl alcohol, tetramethylene sulfone (sulfolane), N-methyl pyrrolidone, dimethyl formamide, dimethyl sulfoxide, octanol or the like, as well as mixtures thereof. When present, the optional solvent is present in any desired or effective amount, in one embodiment about 1 liter of solvent per every 0.1 mole of Leuco version of the basic dye component, in another embodiment about 1 liter of solvent per every 0.3 mole of Leuco version of the basic dye component, and in yet another embodiment about 1 liter of solvent per every 0.35 mole of Leuco version of the basic dye component, and in one embodiment no more than about 1 liter of solvent per every 2 moles of Leuco version of the basic dye component, in another embodiment no more than about 1 liter of solvent per every 1.5 moles of Leuco version of the basic dye component, and in yet another embodiment no more than about 1 liter of solvent per every 1 mole of Leuco version of the basic dye component, although the relative amounts can be outside of these ranges.

Formation of the Carbinol Form of the Basic Dye

After fully oxidizing the basic dye component, the carbinol form of the basic dye can be prepared, for example, by combining the oxidized form of the basic dye and a hydroxide containing base with heating and stirring as suitable to achieve the carbinol form of the basic dye.

Any suitable hydroxide containing base can be selected in embodiments herein. For example, the hydroxide containing base can be selected from the group consisting of, but not limited to, metal hydroxides for example potassium hydroxide, lithium hydroxide, sodium hydroxide, calcium hydroxide, magnesium hydroxide, and barium hydroxide, and mixtures and combinations thereof.

The oxidized form of the basic dye component and the hydroxide containing base are present in any desired or effective relative amounts, in one embodiment about 1 mole of the oxidized form of the basic dye per every about 1 mole of the hydroxide containing base, in another embodiment, about 0.5 mole of the oxidized form of the basic dye per every about 1 mole of the hydroxide containing base, in another embodiment, about 0.75 mole of the oxidized form of the basic dye per every about 1 mole of the hydroxide containing base, although the relative amounts can be outside of these ranges.

The mixture of oxidized form of the basic dye and hydroxide containing base is heated for any effective period of time, in one embodiment at least about 5 minutes, in another embodiment at least about 2 hours, and in yet another embodiment at least about 3 hours, in yet another embodiment at least about 24 hours, and in one embodiment no more than about 4 days, in another embodiment no more than about 60 hours, and in yet another embodiment no more than about 40 hours, although the time can be outside of these ranges.

The product is then neutralized, for example with a NaOH solution, and collected, for example via vacuum filtration. The crude product can then, if desired, be purified, for example by washing with water.

Formation of an Acid Containing Dye

An acid containing dye is prepared by any suitable means, for example, a carboxylic acid containing methane yellow dye is prepared for example by combining an ethoxylated p-formyl aniline (see U.S. Pat. No. 4,658,064, which is hereby incorporated by reference herein in its entirety, which is not meant to limit the present disclosure or claims), cyanoacetic acid, a catalyst, for example ammonium acetate, in a solvent, for example ethanol, with refluxing for a suitable period of time, for example about 4 hours. The solvent is then removed leaving the liquid methane dye.

Formation of the Basic Dye-Acid Dye Internal Salt Composition

The carbinol form of the basic dye and the acid containing dye are combined in any desired or effective relative amounts, in one embodiment about equimolar amounts of each dye although the relative amounts can be outside of this range, with solvent, and heated with stirring, until all of the solvent boiled off.

Examples of suitable solvents include, but are not limited to, ethanol, water, methanol, isopropanol, butanol tetramethylene sulfone (sulfolane), N-methyl pyrrolidone, dimethyl formamide, dimethyl sulfoxide, octanol, or the like, as well as mixtures thereof. When present, the solvent is present in any desired or effective amount, and additional solvent added as necessary to remove the water from the final product. For example, in one embodiment, the solvent can be present in an amount of about 99 grams of solvent per about 1 gram of reactants/product, in yet another embodiment about 75 grams of solvent per about 25 grams of reactants/product, and in yet another embodiment about 25 grams of solvent per about 75 grams of reactants/product, although the relative amounts can be outside of these ranges.

The mixture of carbinol form of the basic dye, acid containing dye, and solvent is heated to any effective temperature, in one embodiment at least about 62° C., in another embodiment at least about 100° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges. Additional solvent is added and the heating process repeated as necessary to insure removal of the water formed by the carbinol-acid interaction.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Part A: Synthesis of the Leuco Version of the Dye

About 30.8 grams of 2,6-diethyl aniline of the formula

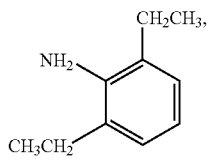

17.5 grams of 2,6-dichloro benzaldehyde of the formula

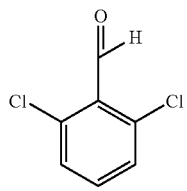

and 50 grams of deionized water were added to a 150 milliliter 1-neck round bottom flask equipped with a Teflon® coated magnet, condenser, and oil bath. The contents were mixed and 21.6 grams of concentrated $H_2SO_4$ were added to the mixed contents. The flask was placed in a 100° C. oil bath and allowed to stir and heat. After about 24 hours of heating, the crude product was poured into a 1 liter beaker containing 500 milliliters of ice water, stirred for about 30 minutes, and allowed to set overnight. The product mixture was then neutralized with about 30 milliliters of 40% NaOH and collected via vacuum filtration. The tan solid was washed with about 500 milliliters of water, reslurried in about 500 milliliters of water, and this process of washing and reslurrying was repeated. The filtered solids were then allowed to dry. The Leuco (colorless) version of the basic dye produced is believed to be of the formula

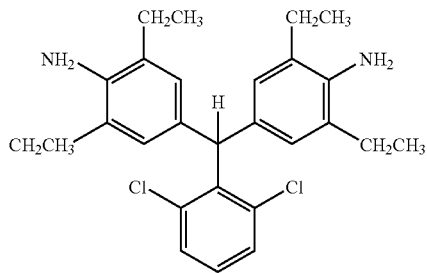

Example 1

Part B: Oxidation of the Leuco Version of the Basic Dye

The solid collected in Example 1, Part A, was added to a 500 milliliter 1-neck round bottom flask equipped with a Teflon® coated magnet, condenser and oil bath. 250 milliliters of ethyl alcohol and 25 grams of chloranil (an oxidizing agent) were added and the flask was placed in a 70 C oil bath with stirring. A blue color began to develop immediately and deepen with time. The flaks was heated fro about 2 hours to insure complete oxidation of the Leuco form of the dye to the fully developed form, believed to be of the formula

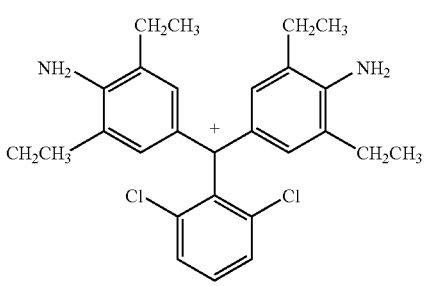

Example 1

Part C: Formation of the Carbinol Form of the Basic Dye

After the reaction mixture had been fully oxidized, as outlined in Example 1, Part B, about 25 milliliters of 40% NaOH was added t the heated/stirred blue dye. The blue color immediately disappeared indicating the formation of the carbinol form of the dye. Heating and stirring was continued for about 5 additional minutes. The crude product was poured into a 1000 milliliter beaker containing 250 milliliters of water and 5 grams of 40% NaOH and allowed to set overnight. The carbinol form of the dye is believed to be of the formula

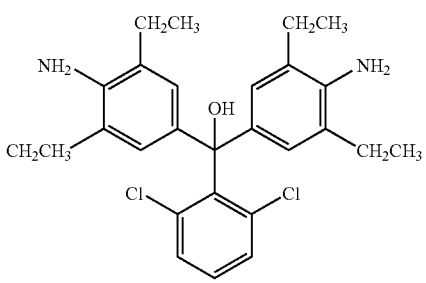

Example 1

Part D: Formation of the Carboxylic Acid Containing Methine Yellow Dye 50 grams of ethoxylated p-formyl aniline (see U.S. Pat. No. 4,658,064, the disclosure of which is hereby incorporated by reference herein in its entirety) of the formula

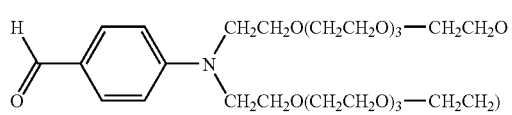

was added to a 250 milliliter 1-neck round bottom flask equipped with a condenser having a Teflon coated magnet and an oil bath, along with 7.6 grams of cyanoacetic acid of the formula

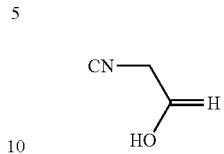

a spatula tip of ammonium acetate (as a catalyst), and 200 milliliters of ethanol. The reaction mixture was refluxed for about 4 hours and the ethanol removed by distillation leaving a viscous yellow liquid methane dye believe to be of the formula

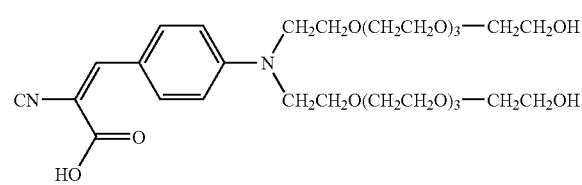

Example 1

Part E: Formation of the Green Basic Dye/Acid Dye Internal Salt

About 30 grams of the carboxylated methane yellow dye from Example 1, Part D about 29 grams of the carbinol form of the tetraethyl version of BB&& dye from example 1, part C, and about 300 milliliters of ethanol were added to a 500 milliliter beaker equipped with a Teflon® coated magnet, condenser and oil bath. The mixture was stirred and heated in a 100° C. oil bath until all of the ethanol boiled off, at which time about 300 milliliters of additional ethanol was added and allowed to boil off. This process was repeated 2 additional times in order to insure that the water formed by the carbinol/acid interaction was removed leaving the Basic Dye/Acid Dye Internal Salt. The final product when cooled was a Green waxy dye believed to be of the formula

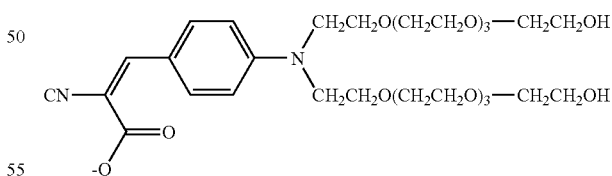
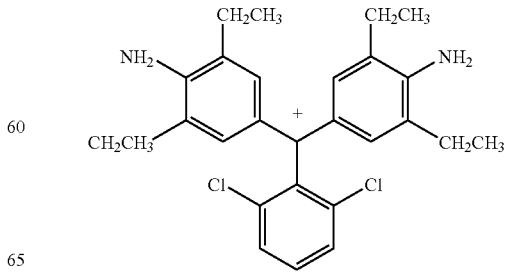

Example 2

Part A: Synthesis of the Leuco Version of the Basic Dye

About 29.8 grams of N,N-diethylamino aniline of the formulae

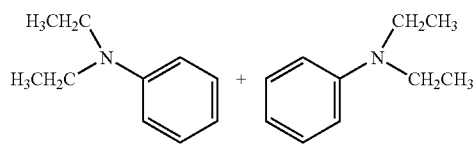

about 17.7 grams of 4-diethylamino benzaldehyde of the formula

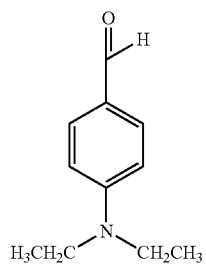

and 100 grams of deionized water were added to a 150 milliliter 1-neck round bottom flask equipped with a Teflon® coated magnet, condenser, and oil bath. The contents were mixed and 21.6 grams of concentrated $H_2SO_4$ were added. The flask was placed in a 100° C. oil bath and allowed to stir and heat. After about 24 hours of heating, the crude product was poured into a 1 liter beaker containing 500 milliliters of ice water and stirred for about 30 minutes and allowed to set overnight. The product mixture was then neutralized with 40% NaOH (about 30 milliliters) and collected via vacuum filtration. The tan solid was washed with about 500 milliliters of water, reslurried in about 500 milliliters of water, filtered, and this processed was repeated. The filtered solids were then allowed to dry. The Leuco (colorless) version of the basic dye produced is believed to be of the formula

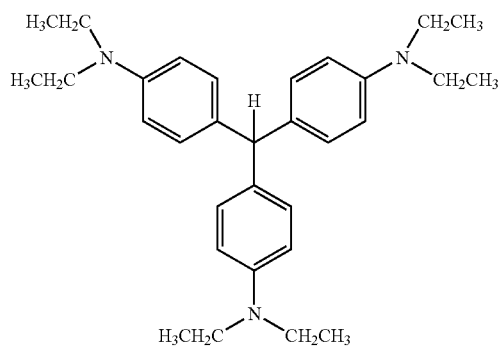

Part B: Oxidation of the Leuco Version of the Basic Dye

The solid collected in Example 2, Part A, 150 milliliters of ethyl alcohol, and 25 grams of chloranil (an oxidizing agent) were added to a 150 milliliter 1-neck round bottom flask equipped with a Teflon® coated magnet, condenser, and oil bath. The flask was placed in a 70° C. oil bath with stirring. A blue color began to develop immediately and deepen with time. The flask was heated for about 2 hours to insure complete oxidation of the Leuco form of the dye to the fully developed form, believed to be of the formula

X-

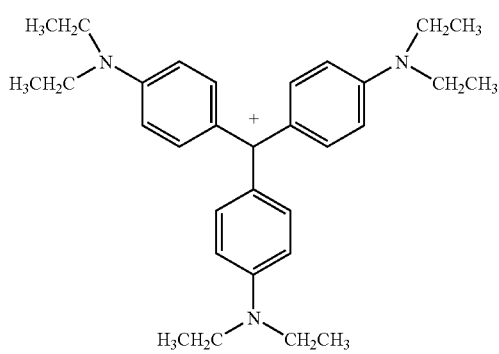

Example 2

Part C: Formation of the Carbinol Form of the Basic Dye

After the reaction mixture had been fully oxidized, as outlined in Example 2, Part B, the pH was made alkaline with 40% NaOH. The blue color immediately disappeared indicating the formation of the carbinol form of the dye. Heating and stirring was continued for 5 additional minutes. The crude product was poured into a 1000 milliliter beaker containing 150 milliliters of water and 2.5 grams of 40% NaOH and allowed to set overnight. The solids were collected by filtration and placed in a sealed container (approx 22.4 grams of carbinol violet dye obtained). The carbinol form of the dye is believed to be of the formula

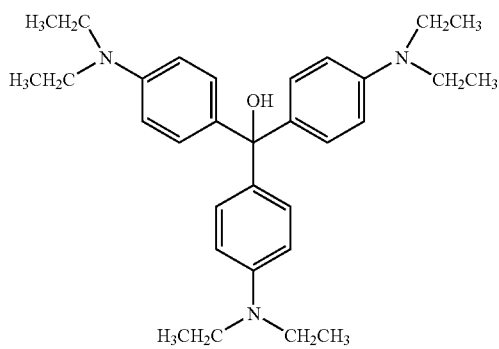

Example 2

Part D: Stearyl Urethane Derivitization of the Mono-Hydroxyl Formyl Aniline 40 grams of mono-hydroxylalkoxylated p-formyl aniline (see U.S. Pat. No. 7,034,185, the disclosure of which is hereby incorporated by reference herein in its entirety) of the formula

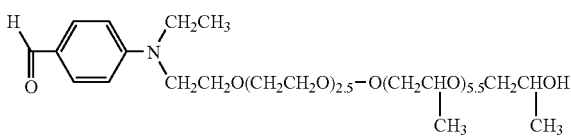

21.4 grams of stearylisocynate of the formula $$CH_3-(CH_2)_{17}-NCO$$

and 2 drops of dibutyltindilaurate catalyst were added to a 250 milliliter beaker equipped with a Teflon coated magnet and a 120° C. oil bath and heated with stirring until infrared spectroscopy reading indicated that the reaction was complete. The contents were then cooled and allowed to solidify into a soft pate-wax consistency. The produced stearyl urethane derivatized p-formylaniline alkoxylate is believed to be of the formula

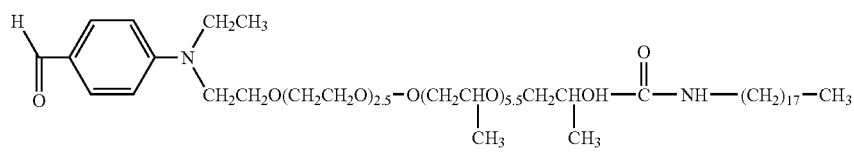

Example 2

Part E: Formation of the Carboxylic Acid Containing Methine Yellow Dye 7.0 grams of cyanoacetic acid and about 80 milliliters of ethanol were added to the 250 milliliter beaker containing the stearyl urethane derivatized p-formylaniline alkoxylate from Example 2, Part D, and the beaker was placed in a 100° C. oil bath with watch glass. The contents were heated and stirred for about 3 to about 4 hours maintaining the level of ethanol throughout the entire reaction by adding more when necessary. After 4 hours, the reaction was poured into a 1 liter beaker containing 500 milliliters of deionized water and allowed to stir overnight. The next day the product had formed a paste wax-like consistency and the water-ethanol solution was decanted. 500 milliliters of water were added, heated with stirring in a 100° C. oil bath for 1 hour, cooled, and the water decanted. The stearyl urethane derivatized alkoxylate carboxylated methane yellow dye obtained is believed to be of the formula

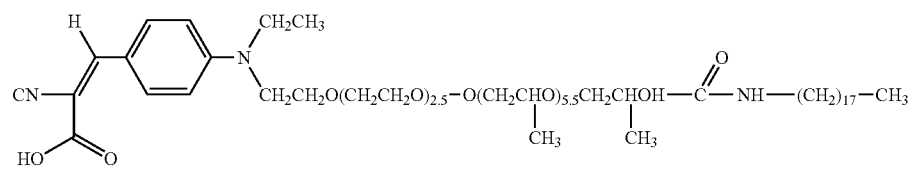

Example 2

Part F: Formation of the Basic Dye/Acid Dye Internal Salt 22.4 grams of the carbinol form of the violet dye from Example 2, Part C and about 300 milliliters of ethanol were added to the stearyl urethane derivatized alkoxylate carboxylated methane yellow dye from Example 2, Part D in a 250 milliliter beaker equipped with a Teflon® coated magnet. The mixture was stirred and heated in a 100° C. oil bath until all of the ethanol boiled off, at which time 300 milliliters additional ethanol was added and allowed to boil off. This was repeated 2 additional times in order to insure the water formed by the carbinol/acid interaction was removed leaving the Basic Dye/Acid Dye Internal Salt believed to be of the formula

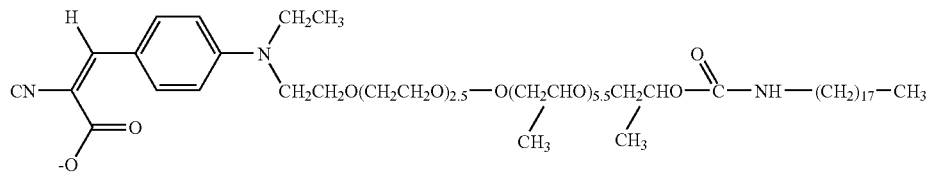

812, the disclosure of which is totally incorporated by reference herein, 8.85 grams of N,N-diethylaniline (obtained from Aldrich Chemical Co.), 0.6 grams of urea (obtained from Aldrich Chemical Co.), and 1.5 grams of concentrated $H_2SO_4$ (obtained from Aldrich Chemical Co.). The flask was placed into a 100° C. oil bath, stirring was commenced, and the mixture was allowed to heat/stir for 3 hours. After 3 hours, 3.1 grams of benzoquinone (obtained from Aldrich Chemical Co.) and 2.0 grams of water were added to the reaction mixture and stirring/heating was continued for 2 hours, at which time the flask was removed from the heat and the violet liquid product was allowed to cool to room temperature. The product at this point was a viscous violet liquid consistent with the formula

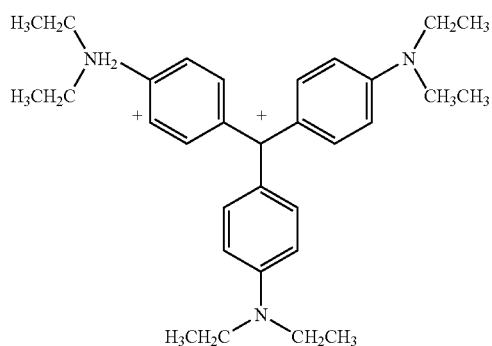

The final product when cooled was a waxy dye having a bluish grey color.

Example 3

Part A. Preparation of Monohydroxyl Triphenylmethane Polyoxyalkylene Triphenyl Methane Violet Colorant To a 100 milliliter 1-necked round bottom flask equipped with a magnetic stirrer was added 20.0 grams (about 0.029 moles) of the para-formylated POE(3.5) POP(6.5) N-ethyl aniline adduct prepared in Example II of U.S. Pat. No. 7,094,

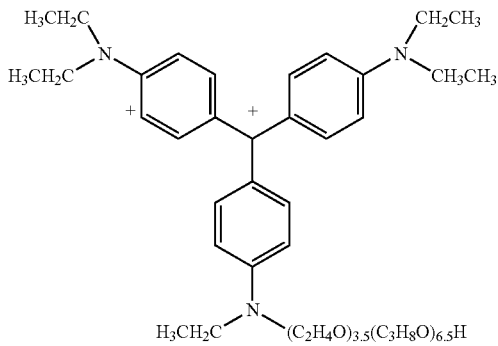

Example 3

Part B: Stearyl Urethane Derivitization of the Mono-Hydroxyl Triphenyl Methane 10 grams of pure mono-hydroxylalkoxylated from Example 3, Part A, (which is purified dissolving in 100 grams of dichloromethane, placed in a separatory funnel, washed twice with 50 grams of deionized water, followed by distillation of the dichloromethane leaving the desired product) 2.8 grams of stearyl isocyanate of the formula

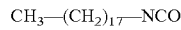

and 1 drop of dibutyltindilaurate catalyst is added to a 100 milliliter beaker equipped with a Teflon coated magnet and a 120° C. oil bath and heated with stirring until infrared spectroscopy reading indicates that the reaction is complete. The contents are then cooled and allowed to solidify into a soft pate-wax consistency. The produced stearyl urethane derivatized triphenyl methane is believed to be of the formula

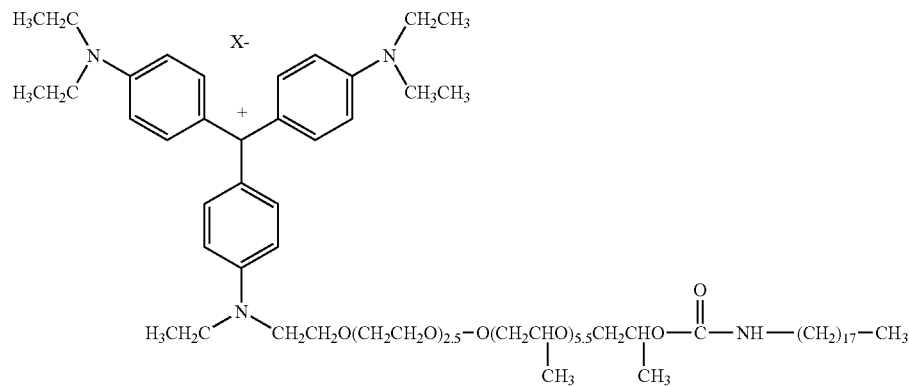

Example 3

Part C: Formation of the Carbinol Form of the Basic Dye

To the 250 milliliter beaker equipped with a Teflon® coated magnet containing the urethane triphenylmethane of Example 3, Part B, is added 50 milliliters of ethyl alcohol and stirred until the product dissolves. The pH is made alkaline with 40% NaOH. The violet color immediately disappears indicating the formation of the carbinol form of the dye. Heating and stirring is continued for 5 additional minutes. The crude product is poured into a 1000 milliliter beaker containing 150 milliliters of water and 2.5 grams of 40% NaOH and allowed to set overnight. The solids are collected by filtration and placed in a sealed container. The carbinol form of the dye is believed to be of the formula

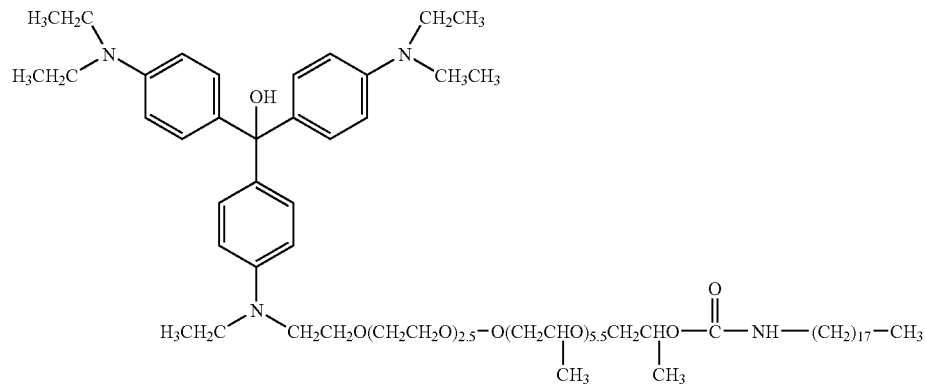

Example 3

Part D: Formation of the Basic Dye/Acid Dye Internal Salt 1.26 grams of the free acid of Acid Orange 8 and about 50 milliliters of ethanol is added to 5.0 grams of the stearyl urethane derivatized triphenylmethane violet dye from Example 2, Part C in a 150 milliliter beaker equipped with a Teflon® coated magnet. The mixture is stirred and heated in a 100° C. oil bath until all of the ethanol boils off, at which time about 50 milliliters additional ethanol is added and allowed to boil off. This is repeated 2 additional times in order to insure the water formed by the carbinol/acid interaction is removed leaving the Basic Dye/Acid Dye Internal Salt believed to be of the formula

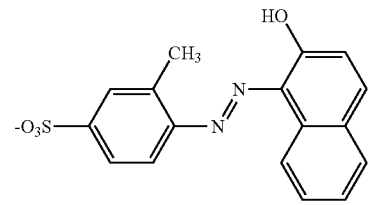

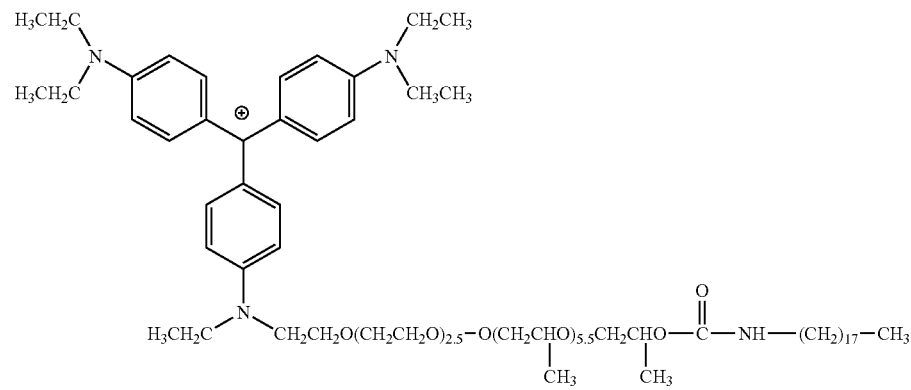

Example 3

Part E: Formation of the Basic Dye/Acid Dye Internal Salt

About 1.73 grams of the free acid of Acid Orange 74 and about 50 milliliters of ethanol is added to about 5.0 grams of the stearyl urethane derivatized triphenylmethane violet dye from Example 2, Part C in a 150 milliliter beaker equipped with a Teflon® coated magnet. The mixture is stirred and heated in a 100° C. oil bath until all of the ethanol boils off, at which time about 50 milliliters additional ethanol is added and allowed to boil off. This is repeated 2 additional times in order to insure the water formed by the carbinol/acid interaction is removed leaving the Basic, Dye/Acid Dye believed to be of the formula

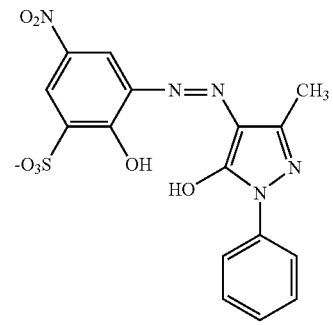

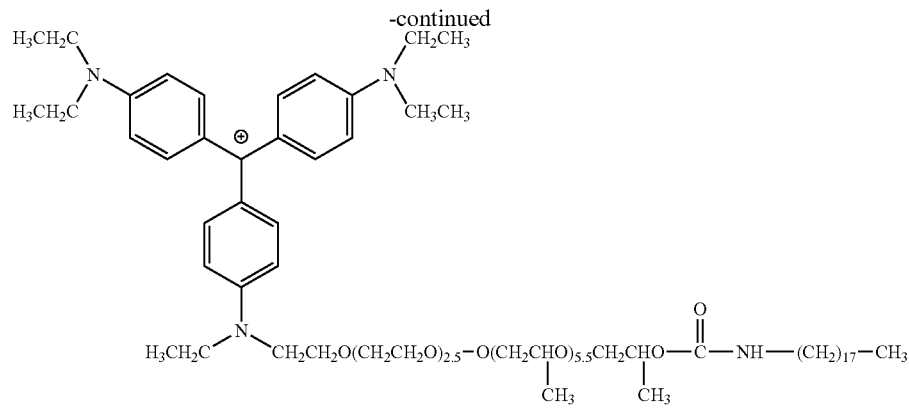

Example 4

Preparation of an Ink Base

An ink base was prepared by melting, admixing, and filtering the following ingredients:

43.59 parts by weight polyethylene wax (PE 655®, obtained from Baker Petrolite) of the formula $CH_3(CH_2)_{50}CH_3$;

19.08 parts by weight stearyl stearamide wax (KEMAMIDE® S-180, obtained from Crompton Corporation);

18.94 parts by weight tetra-amide resin obtained from the reaction of one equivalent of a C-36 dimer acid (obtained from Uniqema, New Castle, Del.) with two equivalents of ethylene diamine and UNICID® 700 (obtained from Baker Petrolite), a long chain hydrocarbon having a terminal carboxylic acid group, prepared as described in Example 1 of U.S. Pat. No. 6,174,937, which is hereby incorporated by reference herein in its entirety;

11.71 parts by weight urethane resin obtained from the reaction of two equivalents of ABITOL® E hydroabietyl alcohol (obtained from Hercules Inc.) and one equivalent of isophorone diisocyanate, prepared as described in Example 1 of U.S. Pat. No. 5,782,966, which is hereby incorporated by reference herein;

6.48 parts by weight urethane resin that is the adduct of three equivalents of stearyl isocyanate and a glycerol-based alcohol, prepared as described in Example 4 of U.S. Pat. No. 6,309,453, which is hereby incorporated by reference herein in its entirety;

0.20 parts by weight NAUGUARD® 445 antioxidant (obtained from Uniroyal Chemical Co.).

Thereafter, 600 grams of the ink carrier components as listed above in the percentages as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER-AID obtained from Fluka Chemika, Switzerland, and proceeded at a temperature of 135° C. until complete after 6 hours. The ink base was poured into molds containing about 31 grams of the colorless ink base and allowed to cool.

Example 5

Preparation of Ink Containing Colorant

About 30.0 grams of ink base from Example 4 was placed in a 100 milliliter beaker with a magnetic stir bar and subsequently placed in a 135° C. oil bath until molten. About 2.0 grams of the dye product of Example 1, Part E was then added and stirred for about 3 hours. The magenta colorant was then poured into an aluminum mold.

Example 6

Preparation of Ink Containing Colorant

About 30.0 grams of ink base from Example 3 was placed in a 100 milliliter beaker with a magnetic stir bar and subsequently placed in a 135 C oil bath until molten. About 2.0 grams of the dye product of Example 2, Part F was then added and stirred for about 3 hours. The magenta colorant was then poured into an aluminum mold.

Example 7

Printing of Ink Samples Containing Colorant

Printed samples of the inks prepared in Examples 4 and 5 were generated on HAMMERMILL LASERPRINT® paper using a K Printing Proofer (manufactured by RK Print Coat Instrument Ltd., Litlington, Royston, Heris, SG8 0OZ, U.K.). In this method, the tested inks were melted onto a printing plate set at 150° C. A roller bar fitted with the paper was then rolled over the plate containing the melted ink on its surface. The ink on the paper was cooled, resulting in three separated images of rectangular blocks (three different intensities of ink coverage on the paper). The most intensely colored block contained the most ink deposited on the paper, and was therefore used to obtain the color value measurements. The printed samples were evaluated visually.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A composition having a basic dye component and an acid dye component providing an internal salt composition wherein at least one of the basic dye component, the acid dye component, or both the basic dye component and the acid dye component comprises a waxy moiety, having the structure

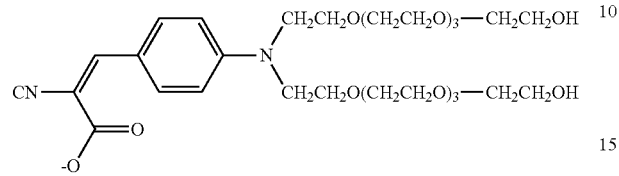

2. A composition having a basic dye component and an acid dye component providing an internal salt composition wherein at least one of the basic dye component, the acid dye component, or both the basic dye component and the acid dye component comprises a waxy moiety, having the structure

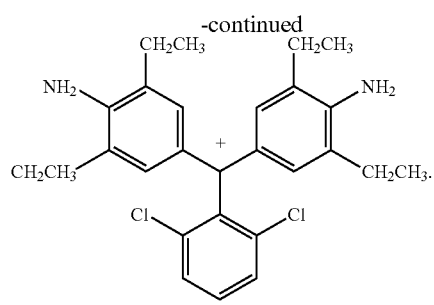

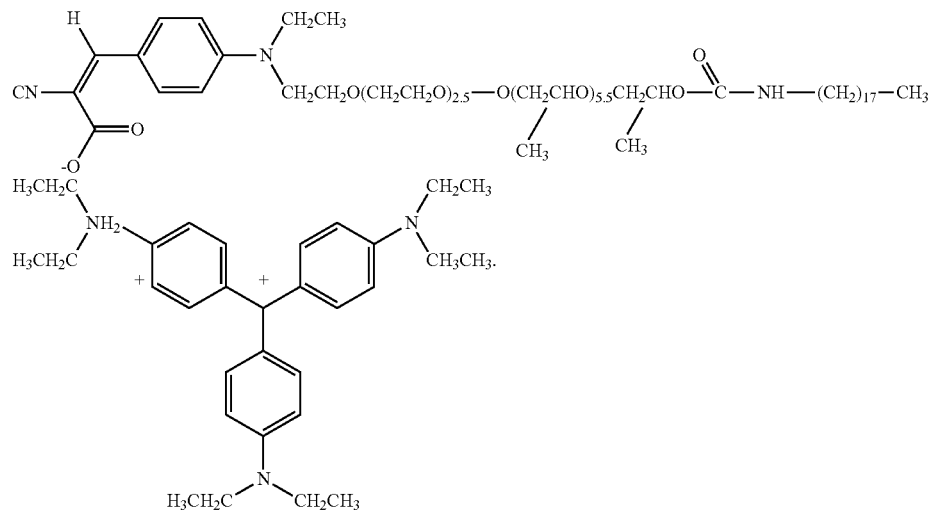

* * * * *